Figure 2:
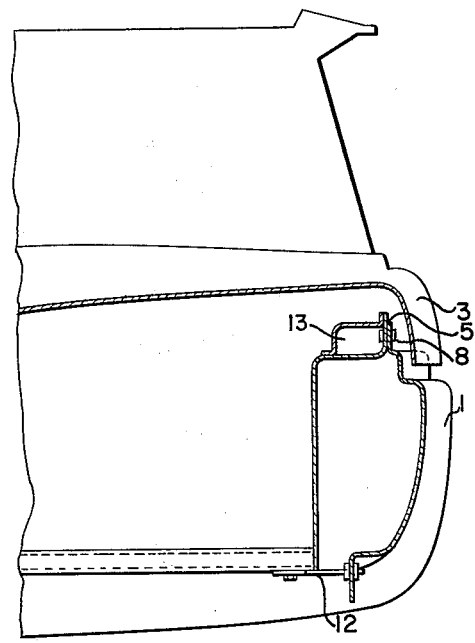

June 11, 1963 B. BARÉNYI 3,093,392
VEHICLE FENDER CONSTRUCTION
Filed June 22, 1959 2 Sheets-Sheet 1
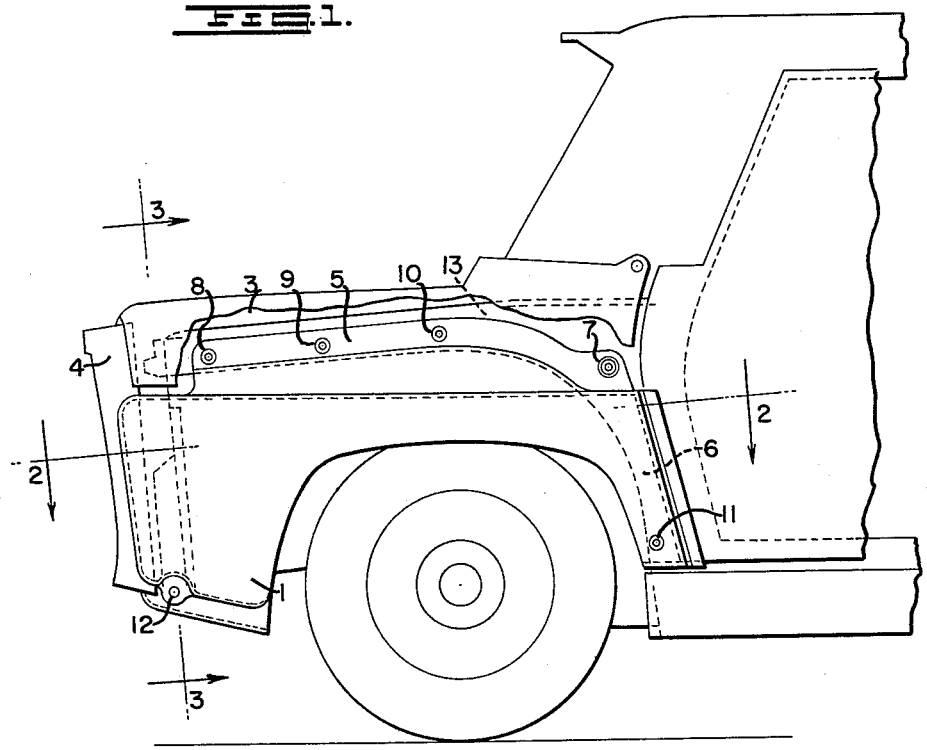
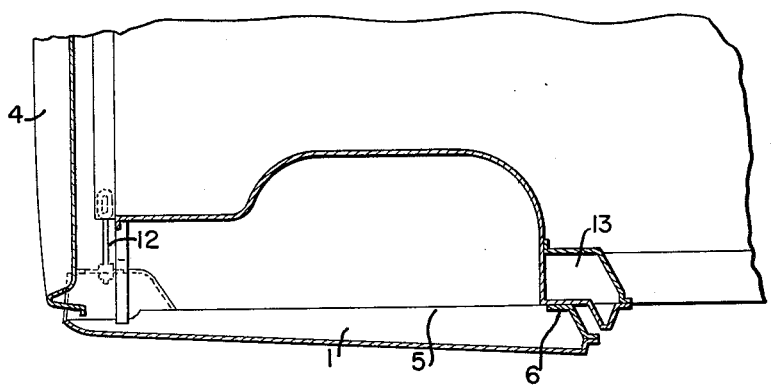
INVENTOR
BÉLA BARÉNYI
BY Dicke, Craig and Freudenberg
ATTORNEYS United States Patent Office 3,093,392
Patented June 11, 1963

1

3,093,392
VEHICLE FENDER CONSTRUCTION
Béla Barényi, Stuttgart-Vaihingen, Germany, assignor to Daimler-Benz Aktiengesellschaft, Stuttgart-Unterturkheim, Germany
Filed June 22, 1959, Ser. No. 821,776
Claims priority, application Germany June 24, 1958
2 Claims. (Cl. 280—152)

The present invention relates to a fender construction for motor vehicles, especially passenger motor vehicles.

The present invention is concerned primarily with the problem to simplify the manufacture, assembly, repair and exchange of the fender and, simultaneously therewith, to obtain a better connection between the fender and the vehicle superstructure such as the frame or vehicle body while at the same time offering the possibility to adapt the fender to the remaining vehicle body and to construct the same in a pleasing aesthetic matter.

The fender construction according to the present invention is characterized by a single plane abutment or connecting surface which, during assembly of the fender is secured with another plane lateral surface of the vehicle superstructure, for example, of the frame or body of the vehicle for purposes of providing a rigid connection therebetween.

The abutment or connecting surfaces of the individual fenders may thereby be disposed at an angle to the vehicle longitudinal direction, or, depending on the type of construction of the vehicle superstructure or body and frame thereof, parallel to the longitudinal center plane of the vehicle.

A further appropriate constructional feature of the present invention resides in the fact that the point determining the position for the fender is disposed in the plane connecting surface between fender and vehicle superstructure. Furthermore, all the securing points may be disposed in the connecting plane between the fender and vehicle superstructure.

In order to avoid any fluttering of the fender, according to another feature of the present invention, the fender, in addition to the rigid connection thereof along the plane abutment surface, may be additionally connected at the lower forward part with the remainder of the vehicle superstructure by means of a transverse strut member.

Accordingly, it is an object of the present invention to provide a fender construction which is relatively simple and inexpensive in manufacture and assembly, and which offers considerable advantages and facilitates disassembly thereof in case of repairs.

Another object of the present invention is the provision of a fender construction for a passage motor vehicle which obviates the disadvantages encountered in the prior art constructions while at the same time enabling a more accurate yet facilitated positioning of the fender with respect to the remainder of the vehicle body.

Still another object of the present invention resides in the provision of a fender construction for motor vehicles which simplifies the connection of the fender to the vehicle superstructure while at the same time enabling a construction of the fender which is not only pleasing to the eye but also permits adjustment thereof to adapt the same to the contours of the remaining vehicle body.

Still another object of the present invention resides in the provision of a simple connection and support of the fender on the remaining vehicle superstructure which assures absence of any fluttering of the fender during fast drives of the vehicle.

These and other objects, features and advantages of the present invention will become more obvious from the following description when taken in connection with the accompanying drawing, which shows, for purposes of illustration only, one embodiment in accordance with the present invention, and wherein:

FIGURE 1 is a partial side elevational view of the front portion of a passenger motor vehicle provided with a fender construction in accordance with the present invention, FIGURE 2 is a partial horizontal cross-sectional view taken along line 2—2 of FIGURE 1, and FIGURE 3 is a partial vertical cross-sectional view taken along line 3—3 of FIGURE 1.

Referring now to the drawing, wherein like reference numerals are used throughout the various views to designate corresponding parts, reference numeral 1 designates the fender in accordance with the present invention. The fender illustrated in the drawing surrounds the upper region of the left forward vehicle wheel. However, it is understood that the other fender, i.e., the right front fender is of mirror-image-like construction. The vehicle hook or lid 3 is disposed above the fender 1. The two forward fenders of which only the left fender 1 is illustrated together with the hood-shaped member 3 surround in part the vehicle front end 4 which may be of any suitable construction and closes off the vehicle superstructure toward the front end thereof.

In the embodiment illustrated herein, the basic inventive concept is realized by a fender 1 which is provided in the upper region thereof as well as in the region thereof disposed therebehind in the driving direction of the vehicle with plane abutment or connecting surfaces 5 and 6. The abutment or connecting surfaces 5 and 6 have the form of a boomerang-shaped bent strip the upper part of which is designated in FIGURE 1 by reference numeral 5 and the part of which disposed toward the rear of the upper part in the driving direction of the vehicle is designated by reference numeral 6 in FIGURE 1. The point by means of which the fender is positioned with respect to the remainder of the vehicle body which is designated in FIGURE 1 by reference numeral 7 is disposed approximately at the place where the abutment or connecting surfaces 5 and 6 intersect each other. A bolt, abutment pin or the like is arranged at point 7 in order to position the entire fender 1 in its position with respect to the remainder of the vehicle. The upper part 5 of the plane abutment surface includes three securing points 8, 9 and 10 as illustrated in FIGURE 1. The vehicle superstructure includes a side member which forms, at least in part, a longitudinally extending girder or bearer member 13 for partially supporting the vehicle. This longitudinally extending girder extends substantially within the plane of the vehicle wheel and partially surrounds the vehicle wheel by rising upwardly within the region of the trailing edge of the wheel to extend thereover. The fender 1 is rigidly connected with the girder member 13, which is part of the vehicle superstructure, by known means at points 8, 9 and 10, as illustrated in FIGURES 1 and 3. A further securing point 11 is disposed in the part 6 of the plane abutment surface which is disposed to the rear of the part 5 thereof as seen in the driving direction of the vehicle. FIGURE 2 also shows the position of the upper part of the plane abutment or connecting surface in which the same is designated again by reference numeral 5.

The fender 1 according to the illustrated embodiment is operatively connected in the forward lower region thereof with the remainder of the vehicle superstructure by an additional transverse strut designated by reference numeral 12. The strut 12 thereby effectively prevents any possible fluttering of the fender 1 when the vehicle is in motion, particularly at relatively high speeds thereof.

While I have shown and described one embodiment in accordance with the present invention, it is understood that the same is not limited thereto but is susceptible of many changes and modifications within the spirit and scope of the present invention, and I, therefore, do not wish to be limited to the details described and illustrated herein, but intend to cover all such changes and modifications as are encompassed by the scope of the appended claims.

I claim:

1. In a fender arrangement for a motor vehicle having at least one wheel, a superstructure including an outer body having a fender panel for said wheel, and frame means for supporting said body including at least one main support girder extending longitudinally and laterally of the vehicle substantially in the longitudinal plane of the vehicle containing said wheel, the improvement comprising means for supporting said fender panel including said girder, said longitudinal girder extending in approximately a quarter arc around the periphery of said wheel and being spaced therefrom, said longitudinal girder being provided with a vertical connecting surface extending substantially longitudinally and horizontally of the vehicle essentially over the wheel to be contained within the construction and a substantially vertical connecting surface extending upwardly with respect to the road surface from the region of the trailing edge of said wheel, said connecting surfaces being essentially parallel to the central longitudinal plane of the vehicle, said connecting surfaces serving for mounting of said fender panel, an abutment surface complementary to said connecting surfaces provided on said fender panel, and means for rigidly connecting said horizontally extending vertical connecting surface and said upwardly extending connecting surface to said abutment surface on said panel at a plurality of points spaced along the length thereof.

2. A fender construction as defined in claim 1, further including a positioning point for arranging said fender with respect to said vehicle superstructure, said positioning point being disposed between said longitudinally extending and said upwardly extending vertical connecting surfaces in the connecting plane formed by said surfaces, and means for connecting the end part of said fender with said vehicle superstructure located opposite the intersection of said connecting surfaces at the open end of the V formed thereby, said last-mentioned means including a transverse strut member, and wherein all the securing points between said fender and said bearing member are disposed in the connecting plane between said fender panel and said bearer member.

References Cited in the file of this patent

UNITED STATES PATENTS

| | | |
|---|---|---|
| 1,974,535 | Graffis | Sept. 25, 1934 |
| 2,059,305 | Best | Nov. 3, 1936 |
| 2,115,903 | Breer et al. | May 3, 1938 |
| 2,362,077 | Ledwinka et al. | Nov. 7, 1944 |
| 2,404,870 | Ulrich | July 30, 1946 |
| 2,455,629 | Van Stone | Dec. 7, 1948 |
| 2,627,426 | Toncray et al. | Feb. 3, 1953 |
| 2,634,138 | Zabel | Apr. 7, 1953 |

FOREIGN PATENTS

| | | |
|---|---|---|
| 494,133 | Great Britain | Oct. 20, 1938 |
| 651,026 | Great Britain | Mar. 7, 1951 |